United States Patent
Nijim et al.

(10) Patent No.: US 12,482,176 B1
(45) Date of Patent: Nov. 25, 2025

(54) MACHINE LEARNING AND DISTRIBUTED PROCESSING FOR CREATING AVATARS WHILE WATCHING VIDEO CONTENT

(71) Applicant: Cox Communications, Inc., Atlanta, GA (US)

(72) Inventors: Yousef Wasef Nijim, Cumming, GA (US); Anthony Joseph Insinga, Powder Springs, GA (US); Carol Jeanette Ansley, Johns Creek, GA (US)

(73) Assignee: Cox Communications, Inc., Atlanta, GA (US)

( * ) Notice: Subject to any disclaimer, the term of this patent is extended or adjusted under 35 U.S.C. 154(b) by 303 days.

(21) Appl. No.: 18/298,886

(22) Filed: Apr. 11, 2023

(51) Int. Cl.
| | |
|---|---|
| *G06T 17/00* | (2006.01) |
| *G06V 10/44* | (2022.01) |
| *G06V 10/70* | (2022.01) |

(52) U.S. Cl.
CPC .............. *G06T 17/00* (2013.01); *G06V 10/44* (2022.01); *G06V 10/70* (2022.01)

(58) Field of Classification Search
CPC ......... G06T 17/00; G06V 10/44; G06V 10/70
See application file for complete search history.

(56) References Cited

U.S. PATENT DOCUMENTS

| | | | |
|---|---|---|---|
| 11,935,170 B1* | 3/2024 | Jain ...................... | G06V 40/28 |
| 2004/0179039 A1* | 9/2004 | Blattner .................. | H04L 51/00 |
| | | | 715/758 |
| 2015/0037011 A1* | 2/2015 | Hubner .............. | H04N 21/4147 |
| | | | 386/264 |
| 2017/0230320 A1* | 8/2017 | Knight .................... | H04L 51/10 |
| 2022/0124873 A1* | 4/2022 | Khalid .................. | H04W 88/10 |

\* cited by examiner

*Primary Examiner* — Sing-Wai Wu
(74) *Attorney, Agent, or Firm* — Merchant & Gould P.C.

(57) ABSTRACT

According to aspects disclosed herein, a method of using machine learning as part of creating avatars while watching video content is provided. According to an aspect, a method is configured for receiving a request to create an avatar based on the video content and, in response to receiving the request to create the avatar based on the video content, determining one or more processing resources to use to create the avatar based on an output of a machine learning engine, wherein the one or more processing resources include a cloud-based processing resource, an edge-based processing resource, and a local processing resource. The method includes allocating avatar processing operations to the one or more processing resources to create the avatar based on the output from the machine learning engine. The method further includes creating the avatar using the one or more processing resources, and storing the avatar in an avatar database.

20 Claims, 13 Drawing Sheets

MACHINE LEARNING AND DISTRIBUTED PROCESSING FOR CREATING AVATARS WHILE WATCHING VIDEO CONTENT

BACKGROUND

An avatar is a personalized graphical representation of a user, character, or object that can be represented and animated in a three-dimensional (3D) form for use in games, web-based applications, and virtual reality (VR) environments. Avatar creation includes use of detailed 3D models to realistically portray a character, such as a celebrity for example, as an avatar. For example, 3D models can be used to represent geometric and animation characteristics (e.g., body/limb movements, hand gestures, facial expressions, eye movements, etc.) of characters to provide high-quality avatar representations.

Processing power and speed, bandwidth constraints, and robust modeling algorithms play important roles when generating quality and realistic avatar representations. For example, the rendering quality of a modeling algorithm used to generate a human appearance as a 3D model depends on many factors including image processing accuracy and graphics processing power to name a few. Once generated, an avatar can be used in social networks, gaming, and virtual reality (VR) applications, or among other applications. For example, VR applications can provide an interactive 3D experience that users can manipulate to feel like they are immersed in another world or environment. Again, processing, bandwidth, and latency considerations are important for providing a realistic and smooth-flowing virtual experience when using an avatar. For example, unwanted amounts of latency may occur when using an avatar in virtual reality applications due to various operational parameters and inherent delays associated with processing operations, networking operations, synchronizing operations, etc.

SUMMARY

According to aspects disclosed herein, a method of using machine learning as part of creating avatars while watching video content is provided, but are not so limited. According to an aspect, a method is configured for receiving a request to create an avatar based on the video content and, in response to receiving the request to create the avatar based on the video content, determining one or more processing resources to use to create the avatar based on an output of a machine learning engine, wherein the one or more processing resources include a cloud-based processing resource, an edge-based processing resource, and a local processing resource. The method also includes allocating avatar processing operations to the one or more processing resources to create the avatar based on the output from the machine learning engine. The method further includes creating the avatar using the one or more processing resources, and storing the avatar in an avatar database.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
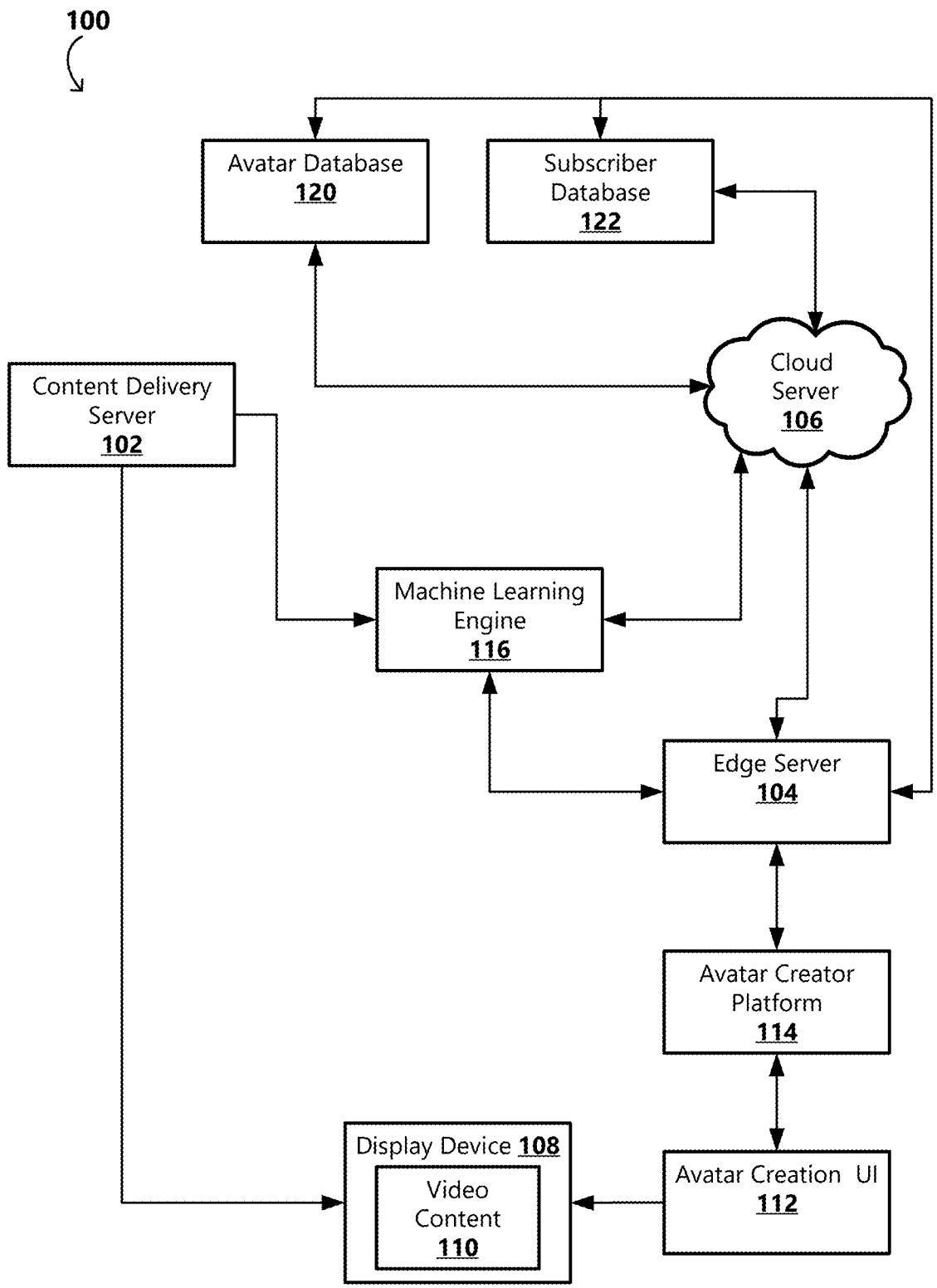
FIG. 1 is a block diagram of an exemplary system that is configured to create avatars while a user watches or consumes video, according to an aspect.

FIG. 1 is a block diagram of an exemplary system 100 that is configured to create avatars while a user watches or consumes video, such as linear video content, video-on-demand (VOD), over-the-top (OTT) or streaming video, broadcast video, and other types of video content, according to an aspect. For example, system 100 enables users, such as subscribers or customers of a service provider, to create high-quality avatars based on actual movie or linear video characters displayed when watching video. System 100 is configured to provide an integrated platform that enables users to create an avatar while watching video or from a program guide as well as providing additional gadgets to manipulate or outfit the avatar (e.g., apply different clothes, adjust characteristics of the avatar (e.g., skin color, eye color, hair color, facial expressions, body movements, etc.), add objects from a scene of the video content, add a scene from the video content, etc.) according to a user preference.

As described herein, system 100 of an aspect utilizes machine learning to determine one or more processing resources to use when allocating priority to create an avatar, such as one or more of an edge-based processing resource, a cloud-based processing resource, and/or a local processing resource (e.g., gateway, router, set-top-box (STB), tablet, smartphone, etc.). For example, an edge server 104 can be provisioned at a headend location of a service provider and given priority for avatar processing operations rather than using the cloud or back end equipment to process the avatar.

As a result, latency can be reduced, processing bandwidth can be freed up in the cloud/back end, and an equitable distribution of different modules of system 100 can be utilized. Typically, edge server 104 at a headend location will be closer to an end-user as compared to cloud or back end resources.

System 100 enables users to create avatars, share avatars with other users or platforms, distribute avatars to other devices, immerse avatars into different virtual and gaming environments, control priority for airtime allocation, enable priority on the edge to enhance user experience, etc. As described below, system 100 can adapt to the low latency and high bandwidth requirements for the avatar creation process, virtual reality, and video processing loads, since logic and/or modules of system 100 can be installed and systematically executed using a distributed number of processing resources located on the edge, in the cloud, back office, in an STB or a gateway, a streaming device etc.

As shown in FIG. 1, and according to an aspect, system 100 comprises an integrated platform for creating and/or purchasing avatars from various types of video content 110. System 100 of an aspect includes a content delivery server computer or server 102, an edge server computer or server 104, and/or a cloud server computer or server 106. The system 100 further includes a display device 108 configured to display video content 110 received from the content delivery server 102 or other source, an avatar creation user interface (UI) or client 112, an avatar creator platform 114, and/or a machine learning engine 116. Video content 110 can be pre-processed by analyzing metadata, using facial or/or character recognition techniques, and/or additional files/data which can be used to identify characters, objects, or scenes that are available for use as or with an avatar 118. In some cases, a service provider or content delivery provider can pre-process video to enable identification of characters, items/objects, and/or scenes in order to create and/or purchase avatars. In some cases, scalable codec functionality can be utilized to provide avatar feature layers that can be activated to display available avatars and other avatar tools while a user is watching video content 110. For example, a user STB can include a scalable video codec that is able to parse a video stream for avatar feature layers when providing video content 110 to display device 108.

According to one aspect, edge server 104 includes an interactive application programming interface (API) that couples to a virtual reality, gaming platform, and/or machine learning engine 116. According to desired implementations, machine learning engine 116 can also be located with one or more of edge server 104, cloud server 106, a back office server, etc. While avatar creation UI 112 is shown as a separate component, avatar creation UI 112 can be included as part of the functionality of the display device 108 or some other computing device or equipment (e.g., user companion device). For example, display device 108 may be a smart television and avatar creation UI 112 may be accessed and/or controlled from a different device, such as a smartphone, laptop, tablet, or other device type. Depending on capabilities of display service 108, avatar creation UI 112 can be utilized to create avatars solely via display device 108 and any associated control equipment (e.g., remote control, wireless interface, etc.).

As described further below, avatar creator platform 114 is configured with three-dimensional (3D) modeling functionality, such as one or more types of 3D modeling algorithms, that operate to generate high-quality and realistic avatars 118. Depending on a number of operational parameters and/or constraints, functional logic or modules of the avatar creator platform 114 can be distributed between one or more of avatar creation UI 112, edge server 104, cloud server 106, display device 108, and/or some other system or component, such as an STB, wireless gateway, router, or other access point (AP) for example.

Generated avatars 118 can be stored in avatar database 120. In some cases, popular avatars can be pre-generated and stored in avatar database 120 for quick retrieval. Subscriber database 122 includes subscriber information, such as subscription types and/or processing priorities for example, that can be referred to by avatar creator platform 114 or avatar creation UI 112 when creating an avatar 118. For example, a subscription type and/or processing priority can be retrieved when a subscriber wishes to create an avatar 118 while watching a television program and used by avatar creator platform 114 to determine a type of 3D modeling algorithm and/or which processing resources (e.g., edge server 104, cloud server 106, local processing resources, etc.) to use to create the avatar 118.

As described herein, avatar creation UI 112 is configured to create an avatar 118 based on a character, object, scene, or other visual representation being displayed while watching or consuming video content 110, such a live television program, movie, etc. For example, while watching a scheduled television program or VOD, avatar creation UI 112 can be used to automatically identify and select a character displayed in a scene for use as an avatar 118. According to an aspect, once a character or other object is selected for creating an avatar 118, avatar creation UI 112 is configured to generate a request that is sent to avatar creator platform 114 to model the avatar 118 based on the character, object, scene, or other visual representation displayed with video content 110. In some cases, avatar creator platform 114 selects a type of 3D modeling algorithm to use to create the avatar 118 based on one or more of an output of machine learning engine 116, available bandwidth, an amount of latency observed or predicted based on creation of a previous avatar, a subscription type, a user type, other running applications, complexity of character characteristics, etc. Details of machine learning engine 116 are described in more detail below with reference to FIG. 6.

As described above, avatar creation UI 112 can be configured to identify one or more characters, objects, scenes, or other visual representations that can be used to generate one or more avatars 118 while a user is watching video content 110 without unduly interrupting the viewing experience. As an example, once the avatar creation UI 112 has been used to select a character to use as a basis to create an avatar 118, avatar creation UI 112 transmits a message to avatar creator platform 114 to create the avatar 118 in the background including selecting a type of 3D modeling algorithm to use to create the avatar 118. In some cases, creation of an avatar 118 is hidden from the user so that the user can continue watching the video content 110. As described above, components of avatar creator platform 114 can be distributed across edge server 104, cloud server 106, and/or some other component and used to identify a subscription type, a user type, model type, and/or other criteria to use when creating the avatar 118.

According to an aspect, system 100 can be configured to resume playback of the video content 110 while the avatar 118 is being created (e.g., while displaying a progress bar or spinning progress meter associated with the creation of the avatar 118). In one aspect, once activated (e.g., by a remote control input or voice command), avatar creation UI 112 is configured to pause playback of video content 110 being watched to enable a user to select or identify a character, object, or scene to be used when generating an avatar 118. For example, avatar creation UI 112 can be activated automatically when a user pauses playback of the video content 110, presses a dedicated avatar creation button on a remote, issues a voice command to create an avatar 118, etc. For example, a user can use a remote control that accepts voice inputs to issue a voice command "show avatars" while watching a show on a smart television. In response to the voice command, avatar creation UI 112 or another component pauses playback of the show and displays available avatars from the paused scene and/or for the entire duration of the show. In some aspects, avatar creation UI 112 can be configured to use received voice commands for the entire process of selecting, accepting, sharing, immersing, purchasing, etc. avatars while watching video content 110.

Depending on the type of video content 110 being viewed, once playback is paused, avatar creation UI 112 of an aspect is configured to buffer frames or portions of the video content 110 into a local or remote memory resource to initiate the avatar creation process. According to one aspect, if the user is watching linear video content, avatar creation UI 112 operates to prioritize buffering the linear video content in the buffer so that user can watch the buffered content after finishing creating and/or purchasing the avatar 118. If the user accidentally tunes to another program during the avatar creation process, avatar creation UI 112 of one aspect prevents tuning to a new channel and continues buffering the current program. Alternatively, avatar creation UI 112 can be configured to treat a channel selection as a decision to discontinue creating an avatar 118. In some cases, there may be a cost associated with creating and outfitting an avatar 118 which may be based on a type of subscription, user type, or some other criteria.

As described above, system 100 enables users to purchase characters, objects or items, scenes, scene portions, etc. while watching a live program, movie, VOD series, advertisements, etc. For example, avatar creation UI 112 can be used to allow a user to create an avatar 118 of a character of a movie being watched based on inputs to a remote control, touch screen, voice command interface, wearable interface, or some other interface. Avatar creation UI 112 can be configured to identify available avatars for the customer to obtain, free or for purchase, for the video content 110 being watched based in part on a playback position or scene in the video content 110. Avatar creation UI 112 can also be configured to identify multiple characters of a scene, frame, or multiple frames that may be used to create avatars. For example, avatar creation UI 112 enables the selection and/or purchase of one or more available avatars, other items, and/or scenes while watching video content 110 using a television display as part of the avatar creation platform without having to login to a separate portal or website using a different device, such as a personal computer or mobile device.

According to an aspect, avatar creation UI 112 can be configured to visually identify that a character is available for purchase and/or use as an avatar 118 by emphasizing or otherwise bringing attention to the character (e.g., halo around the character, highlighting the character, layer of color applied to the character, etc. before or after a user indicates that they are interested in an avatar purchase within a scene). Avatar creation UI 112 can also be configured to emphasize objects or items, scenes, or scene portions, such as props for example, that are available for purchase with the avatar 118. For example, an item may be highlighted with a halo, emphasizing marker, icon, or other indicia, that informs a user that the item is selectable, such as motorcycle that the character of interest is riding, a weapon used by the character, a chair the character sits in, etc. for purchase and/or use with the avatar 118.

According to one aspect, once a user indicates that they are interested in an avatar purchase or selection within a scene, avatar creation UI 112 can be configured to overlay a window or other graphical display with available avatars and/or other items from a scene or multiple scenes for selection by a user. Avatar creation UI 112 can also provide an indicator, such as a special icon or other indicia, to a scene or frame, that informs a user that a scene or portion of a scene is available for purchase or use with a selected character. In some cases, not all characters, items, or scenes will be available for purchase or use. However, avatar creation UI 112 can be configured to enable users to view content or purchase avatars from content that they are not subscribed to while navigating. For example, if a customer is not subscribed to a premium move channel, but a movie on channel has available avatars for purchase, then avatar creation UI 112 can be configured to display different purchase options (e.g., rent the movie and buy avatars at discounted price, buy avatars only at higher price, rent the movie with advertisements included, etc.).

As described above, avatar creation UI 112 can be configured to automatically pause the video content 110 to allow time for a user to decide on one or more characters, props, or scenes to use when creating an avatar 118. Avatar creation UI 112 is also configured to allow use of trick play commands (e.g., fast forward, rewind, etc.) to locate desired characters, items/objects, scenes, etc. For example, a user may use a voice command of "create avatar" to signal avatar creation UI 112 to pause the video content 110 in preparation for creating the avatar 118. Once a character, item, or scene is selected (e.g., using remote control, touch input, voice command, etc.), avatar creation UI 112 can be configured to communicate the selection upstream to avatar creator platform 114 to process the selection and provide avatar creation UI 112 with additional information (e.g., purchase price, free, expiration date, etc.) about each character, etc. as well as any modifications that are available for an available avatar.

Before creating avatar 118, avatar creator platform 114 can also query subscriber database 122 to determine whether the user is allowed to use the selected character, etc. and/or has an avatar creation subscription. For example, a user's subscription may be limited to use of certain characters, items, or scenes from a type of video content 110 (e.g., no premium content). Avatar creator platform 114 can also query avatar database 120 to determine whether an avatar 118 has been previously created for a selected character. If the avatar 118 has already been created, the avatar 118 can be provided immediately to avatar creation UI 112 which reduces latency of system 100 to provide the avatar 118 for display and for acceptance/approval/modification.

Once created or identified as previously created, avatar creation UI 112 is configured to display the avatar 118, along with any selected items or scenes, on display device 108 or some other device. For example, avatar creator platform 114 can generate one or more avatar files (e.g., SDK file, application programming interface (API) file, etc.) for the avatar 118 which can be stored in avatar database 120 and provided to avatar creation UI 112 or another component via edge server 104, cloud server 106, or back office. Avatar creation UI 112 can be used to share the avatar (e.g., avatar files) with other users and/or devices. In some cases, avatar creation UI 112 can display the avatar 118 as an overlay or in a separate window with respect to the video content 110.

Additionally, as described further below, avatar creation UI 112 can provide modification tools as an overlay panel or separate window that enables various modifications or feature changes to be made to the avatar 118, such as tool that enables selection of different wardrobes, a tool to combine features of one or more avatars, a tool to select accompanying objects or items, a tool to modify various characteristics or features (e.g., with or without hair, hair color, skin color, eye color, eye size, ear size, mouth size, etc.). For example, in a scene paused by avatar creation UI 112, the character of interest might be wearing a blue dress and avatar creation UI 112 can display other garments or color choices that are also available for that character. Avatar creation UI 112 also allows users to upload videos or images which can be used to further customize an avatar 118.

Software support for avatar merchandising may be added to an STB, back office, edge server 104, and/or cloud server 106 in order to support viewing of avatar choices and/or selection of an avatar 118. According to one aspect, software supporting availability and pricing of avatars, etc. may reside in cloud server 106 to allow scalable computing resources to be allocated as needed. Also, purchases can be flexible so that customers are billed directly to a credit card or other account when making the selection while watching the video content 110 or a cost of an avatar 118 may be added to a cable bill or other subscription (e.g., avatar creation UI 112 can be configured to display an option to select a method of payment or billing).

Avatar creation UI 112 can also be configured to modify programming guide data to show which movies, shows, events, or series have selectable characters as avatars and can be displayed while searching for content and navigating a programming guide. Program metadata can be updated to show types of avatars, pricing, content owner, etc. For example, time blocks associated with a movie having characters available as avatars can be highlighted, emphasized, or include indicia that informs (see FIG. 5F) a user that avatars are available for the movie. Likewise, recommended content, DVR recordings, and other types of video content 118 can be modified to inform a user that avatars are available whether recorded in the cloud, on a STB hard drive, or provided via another type of video delivery platform for example.

Figure 2:
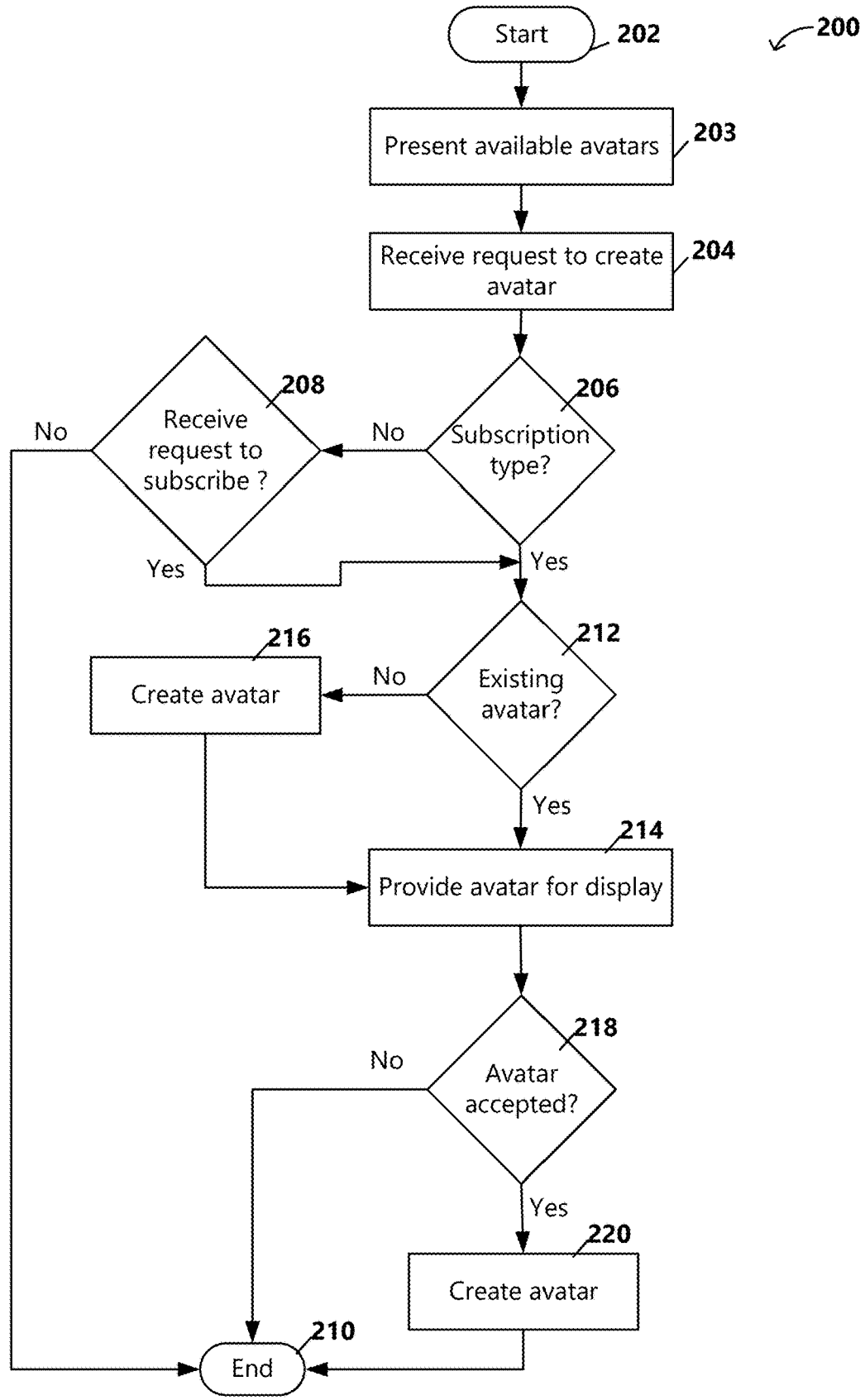
FIG. 2 is a flow diagram of an exemplary method of using an integrated platform to create one or more avatars while watching video content, according to an aspect.

FIG. 2 is a flow diagram of an exemplary method 200 of using an integrated platform to create one or more avatars 118 while watching video content 110, according to an aspect. Method 200 begins at 202 and proceeds to 203 where method 200 uses avatar creation UI 112 to present or display available avatars to a viewer or user via display device 108 or some other device, such as a companion device for example. For example, a user can initiate avatar creation UI 112 from a position in a program or movie being viewed where avatar creation UI 112 presents a list of possible avatars from a particular scene of the program or movie, and/or other available avatars from the rest of the program or movie. At 204, method 200 uses avatar creator platform 114 to receive a request from avatar creation UI 112 to create an avatar 118 based on a character being displayed during video playback. For example, while watching a movie, a user uses a voice command to activate avatar creation UI 112 and initiate an avatar creation process or uses a touch screen input on a companion device to select a character to use as a basis in creating an avatar 118. According to an aspect, method 200 pauses playback of the video and/or buffers the video before starting the avatar creation process.

At 206, method 200 queries subscriber database 122 to determine a type of subscription associated with the user. For example, method 200 can use avatar creator platform 114 to query subscriber database 122 to determine if the user is subscribed to an avatar creation service. Depending on the implementation, there may be different types of subscriptions available to users for creating and purchasing avatars. For example, one type of subscription may be purchased that allows a variety of character types to be used and/or modified as avatars or an ala-carte subscription process that may allow a user to pick and choose from different avatar selection and/or customization features. In some cases, an avatar subscription cost may be included as part of a user's television and/or Internet subscription.

If the user is not a subscriber, at 208 method 200 prompts the user to subscribe to an avatar creation service. If the user declines to subscribe, method 200 ends at 210. If the user is or becomes a subscriber to the avatar creation service, at 212 method 200 queries avatar database 120 or another storage location to determine whether the avatar 118 has been pre-generated and already exists. For example, avatar creator platform 114 can query avatar database 120 for popular characters, such as certain actors, politicians, athletes, etc. which were pre-generated due to expected or prior demand of the corresponding avatars.

If the avatar 118 already exists in avatar database 120, method 200 proceeds to 214 and provides the avatar 118 to avatar creation UI 112 for display and/or modification. For example, method 200 can be configured to provide the avatar 118 as an overlay over the paused video along with a panel of modification tools for modifying the avatar 118. If the avatar 118 does not exist in avatar database 120, method 200 proceeds to 216 and uses avatar creator platform 114 to create the avatar 118 using a type of 3D modeling algorithm before proceeding to 214. For example, depending upon the subscription and/or user type, method 200 can select different 3D modeling algorithms to generate different levels of avatar quality.

If the user does not accept the avatar 118 at 218, method 200 ends at 210. For example, after displaying the avatar 118 with or without modifications, method 200 can use avatar creation UI 112 to display a control to accept or decline the avatar 118. If the user accepts the avatar 118, including any modifications, accompanying items or objects, and/or scenes at 218, method proceeds to 220 and stores the avatar 118 (e.g., locally or in avatar database 120) before ending at 210. In some aspects, method 200 can be extended to enable use of avatar creation UI 112 to share the avatar 118 with other users, distribute the avatar 118 to other devices, and/or immerse the avatar 118 in gaming and/or virtual reality environments.

Figure 3:
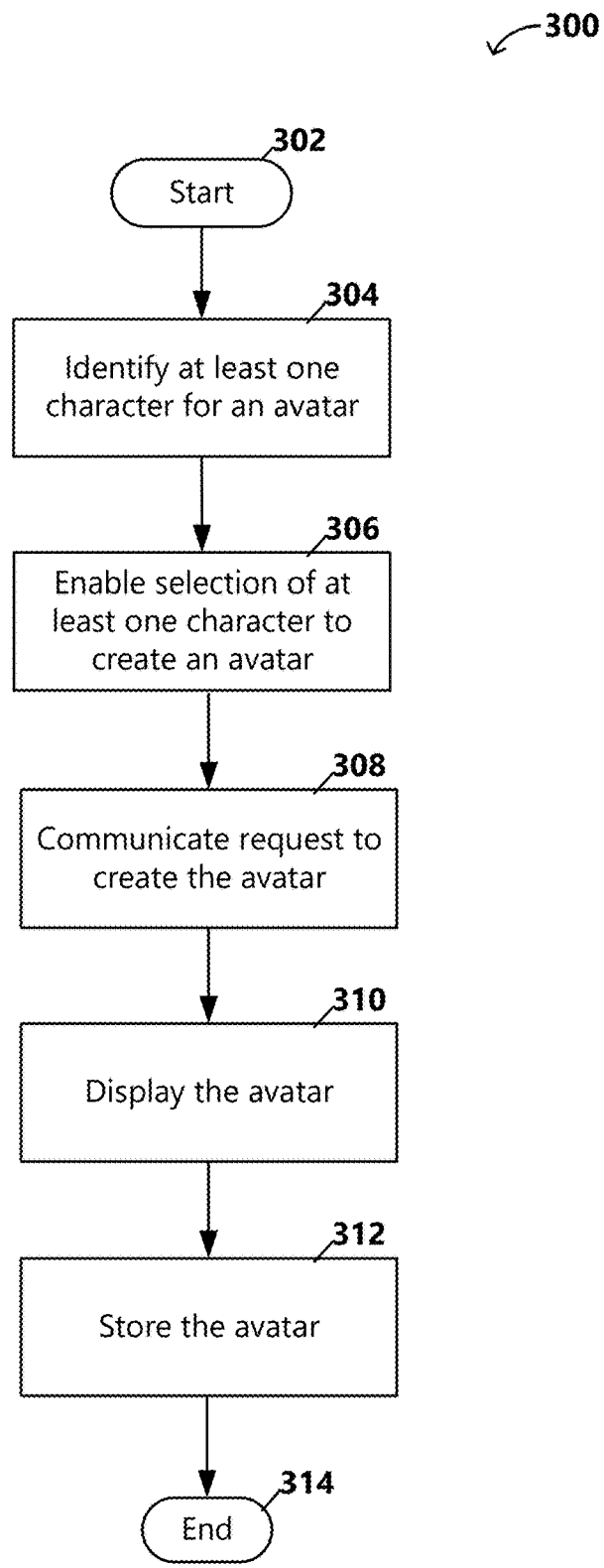
FIG. 3 is flow diagram of an exemplary method of using an avatar creation user interface (UI) to generate an avatar while watching video content, according to an aspect.

FIG. 3 is flow diagram of an exemplary method 300 of using avatar creation UI 112 to create an avatar 118 while watching video content 110, according to an aspect. Method 300 starts at 302 and proceeds to 304 where avatar creation UI 112 operates to identify at least one character of a video scene of the video content 110 that is available as an avatar 118. For example, avatar creation UI 112 operates to identify a character available as an avatar 118 by emphasizing or otherwise bringing attention to the character (e.g., halo around the character, highlighting the character, layer of color applied to the character, etc.). Depending on the configuration of avatar creation UI 112, avatar creation UI 112 can also be configured to display an overlay or window with one or more characters from a scene or scenes of the video content 110 that are available as avatars.

At 306, method 300 uses avatar creation UI 112 to enable selection of at least one character to create an avatar 118. For example, avatar creation UI 112 can be configured to receive touch-based, voice-based, mouse-based, remote control, and other command inputs in order to select a character to be used as a basis for creating an avatar 118. At 308, in response to selection of at least one character, method 300 uses avatar creation UI 112 to communicate a request to avatar creator platform 114 create the avatar 118 based on the selected character. At 310, after the avatar 118 is created, method 300 uses avatar creation UI 112 to display the avatar 118 and/or one or more tools that allow modification and/or acceptance of the avatar 118. At 312, in response to avatar creation UI 112 receiving a control input to accept the avatar 118, method 300 operates to store the avatar 118 before ending at 314. For example, method 300 can be configured to store the avatar 118 in local memory, edge server 104, cloud server 106, avatar database 120, etc. before ending.

Figure 4:
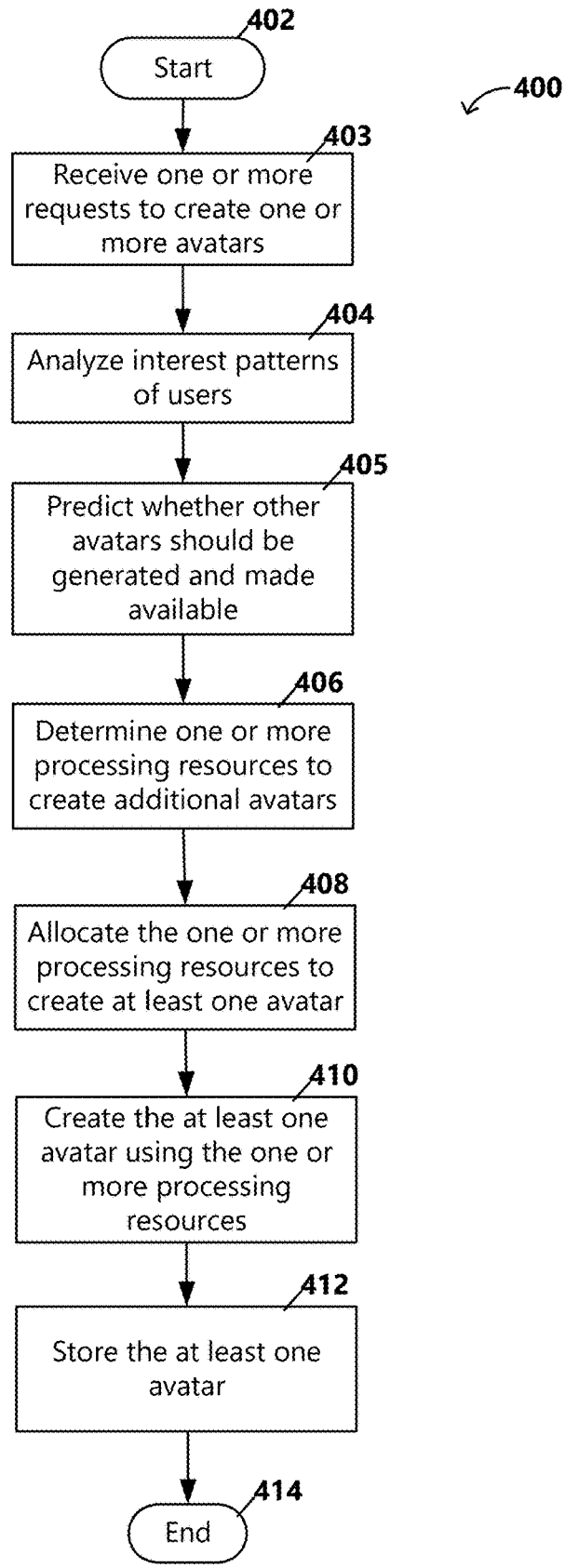
FIG. 4 is a flow diagram of an exemplary method of using machine learning as part of generating an avatar while watching video content, according to an aspect.

FIG. 4 is a flow diagram of an exemplary method 400 of using machine learning as part of generating an avatar 118 in response to one or more users watching video content 110, according to an aspect. Method 400 starts at 402 and proceeds to 403 by receiving one or more requests to create one or more avatars based on at least video content 110. In some aspects, method 400 is configured to use machine learning engine 116 to accept notification of many users' interest in characters of video content 110 to create avatars. For example, machine learning engine 116 can be used to analyze aggregated requests for user avatar preferences. At 404, method 400 uses the machine learning engine 116 to analyze the interest patterns of users as part of identifying additional avatar offerings.

At 405, method 400 uses machine learning engine 116 to predict from that interest and/or purchases that additional avatars should be generated and added to a list of available avatars. For example, avatar creator platform 114 can be activated by machine learning engine 116 through edge server 104 to apply a 3D modeling algorithm as part of an avatar creation process to create an avatar 118 based upon the trends of end user interest and/or purchases of related avatars. In response to receiving the request to create the avatar 118 based on the analysis of the interest patterns from the video content 110, at 406 method 400 determines one or more processing resources to use to create one or more additional avatars.

According to an aspect, method 400 determines one or more processing resources to use to create the avatar 118 based on an output of machine learning engine 116. For example, method 400 can utilize one or more processing resources to create the avatar 118 including a cloud-based processing resource (e.g., cloud server 106), an edge-based processing resource (e.g., edge server 104), and/or a local processing resource (e.g., subscriber's STB, gateway, personal device or computer). For example, avatar creator platform 114 or some other component can be configured with processing allocation functionality that uses machine learning engine 116 to determine which processing resources to use to create the avatar 118 based on a variety of inputs. A machine learning algorithm of machine learning engine 116 can be supervised, unsupervised, etc. and trained with different types of data.

At 408, method 400 operates to allocate avatar processing operations to the one or more processing resources in order to create at least one avatar 118 based on an output from machine learning engine 116. For example, based on an output from machine learning engine 116, method 400 can be configured to allocate 60 percent or greater of the avatar processing operations to edge server 104 and distribute the remaining operations equally or in some proportion to the cloud and/or local processing resources as part of reducing latency and harnessing available processing power or bandwidth when creating and providing the avatar 118 to a user for modification and/or acceptance. In some cases, depending on latency and bandwidth requirements, all of the avatar processing operations can be allocated to an edge server 104 located at a headend or some other location of a service provider to ensure timely and efficient processing of the avatar 118. If one edge resource becomes saturated, method 400 can look to a next closest edge server for assistance with processing operations. At 410, method 400 operates to create the at least one avatar 118 using the one or more processing resources. At 412, method 400 operates to store the at least one avatar 118, such as in avatar database 120 and/or one or more databases of avatar creation UI 112 before ending at 414.

As described further below, FIGS. 5A-5F depict different exemplary aspects of avatar creation UI 112 that can be displayed on display device 108 when creating an avatar 118 while watching video content 110. As described herein, avatar creation UI 112 enables users to purchase characters, items, scenes, etc. from video content 110, such as movies, television series, advertisement programming, etc. For example, avatar creation UI 112 enables a user to select a movie character using a remote control input, touch screen input, voice input, and other input types to create an avatar 118 based on the movie character using a display device 108 as a creation interface, such as a smart television for example.

According to an aspect, avatar creation UI 112 is configured to identify available avatars based on video being consumed and/or a playback position in the video. For example, in a scene with three characters, avatar creation UI 112 can highlight or otherwise indicate which of the characters are available as avatars and/or purchase options while watching video content 110 on a smart television. Avatar creation UI 112 may allow customer to mix and match different available avatars to create a new avatar. Avatar creation UI 112 can also be configured to display purchase options for available avatars, items (e.g., props), scenes, and/or other content and allow a user to accept the avatar 118, along with any modifications and/or accessories, before being added to the user's account. Avatar creation UI 112 enables sharing of avatars with other users (e.g., friends or players) across disparate gaming and/or virtual environment applications.

As an example, a user can manually pause video playback and request (e.g., using remote control, touch, voice, etc.) avatar creation UI 112 to create an avatar 118. For this example, avatar creation UI 112 can be configured to provide a compressed time stamp of a paused scene to query avatar database 120 to determine pre-generated or available avatars relating to the paused scene. Avatar creation UI 112 can then display available avatars associated with the character(s) in the paused scene on display device 108 for selection by the user desiring to use one or more of the characters as one or more avatars. According to one aspect, if a user does not elect to make any changes to a selected avatar 118, avatar creation UI 112 can be configured to send a flag or tag to avatar creator platform 114 and then to edge server 104 or cloud server 106 to identify the movie, extract the relevant scene, create a 3D image, and provide the avatar 118 (e.g., one or more avatar files) to the user.

In some cases, the user may be required to purchase the avatar 118 or subscribe to an avatar service before the avatar 118 is provided to the user. For example, an avatar 118 can be provided as a downloadable file, token, or certificate which can, in turn, be uploaded or distributed to a gaming or virtual reality platform. A gaming or virtual reality platform can retrieve an avatar 118 directly from avatar creation UI 112 platform or a related storage facility (e.g., avatar database 120). Avatar creation UI 112 is also configured to allow a user to upload images or video to equip or modify an avatar 118 or the scene using the same streaming device or another device to take pictures and videos to fit different characteristics of an avatar 118, such as eyes, hair color, skin color, etc. If another device or application is used, a user can access the avatar 118 and/or scene(s) from the other devices using a QR code or another mechanism to authenticate the user. According to an aspect, avatar creation UI 112 can be configured to display a skeleton of the avatar 118 and/or generic clothing and/or coloring as the avatar 118 is being created. Avatar creation UI 112 UI can be deployed on different streaming platforms or provided as a standalone application or available from a website.

Figure 5A:
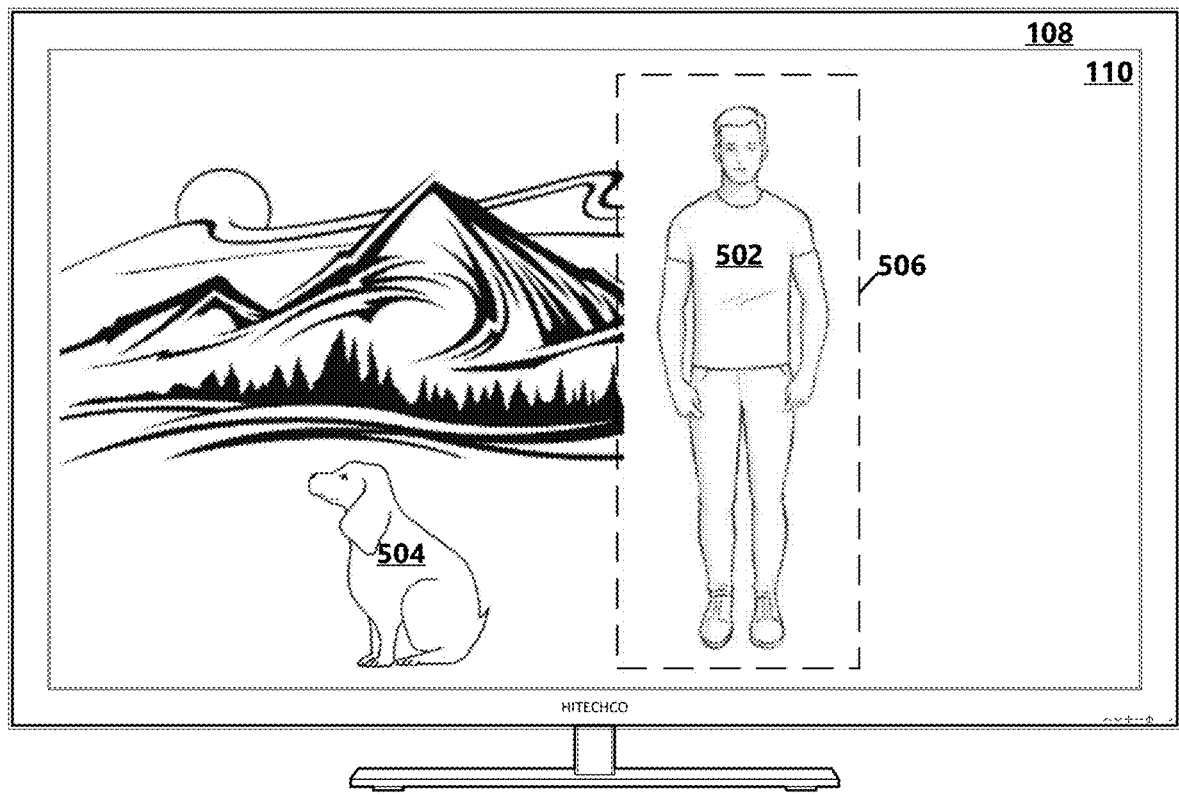
FIGS. 5A-5F depict different exemplary aspects of an avatar creation UI that can be displayed on a display device when creating an avatar while watching video content.

FIG. 5A depicts video content 110 that has been paused while being displayed on display device 108. For example, a user can use a vocal or other command to activate avatar creation UI 112 upon viewing a character that the user would like to use as a basis to create an avatar 118. As shown in FIG. 5A, the paused scene includes a human character 502 and an animal character 504. Avatar creation UI 112 has provided indicia (e.g., halo 506) that informs or alerts a user that human character 502 is available as an avatar 118 while the animal character 504 is not currently available as an avatar 118. In some implementations, avatar creation UI 112 can access metadata to also display a name of the human character 502 and/or a purchase price for the avatar 118. Depending on the capabilities of the display device 108 and/or companion device, different types of input (e.g., remote control input, touch input, gesture input, companion device input, voice input, etc.) may be available for a user to select the human character 502 as a basis to create the avatar 118.

Figure 5B:
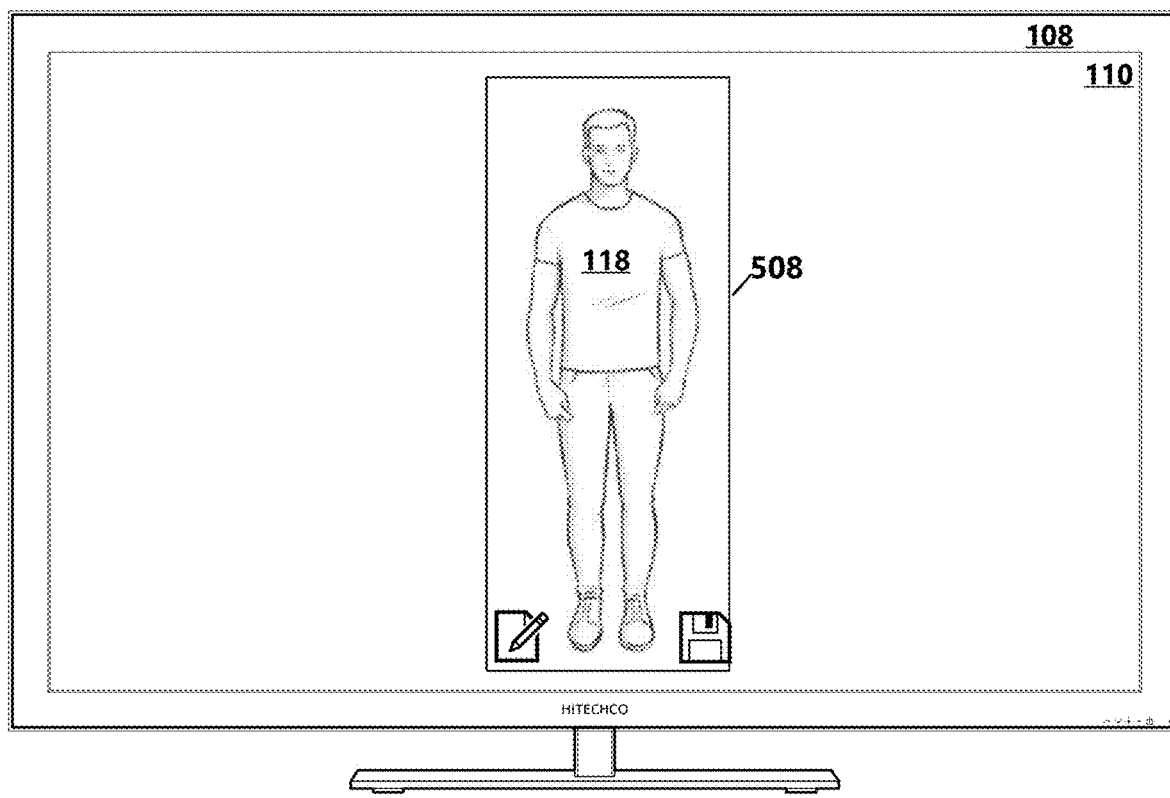
Figure 5C:
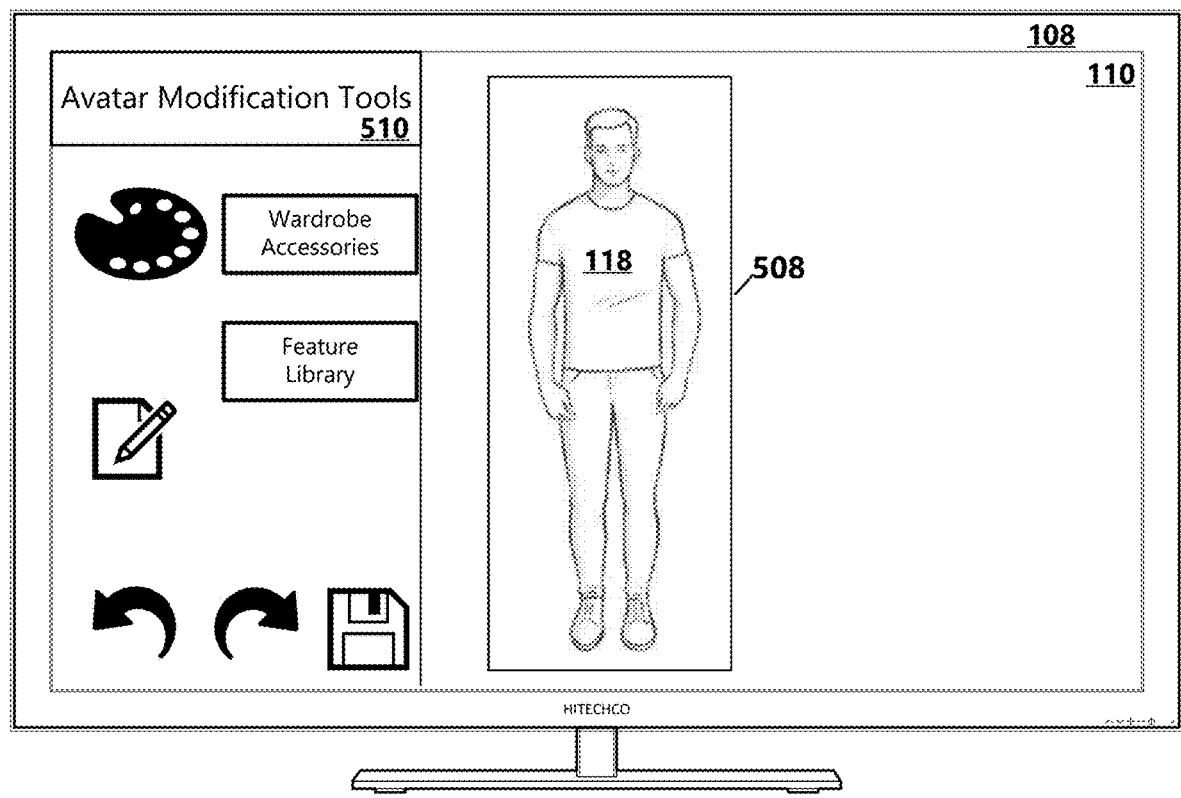

Once selected and created or retrieved, the avatar 118 can be displayed by avatar creation UI 112 as an overlay 508 or as a separate window as shown by the example of FIG. 5B. For the example of FIG. 5B, display of display device 108 includes overlay 508 displaying the avatar 118 (paused video content 110 (not shown) can be dimmed or otherwise obscured). Additional exemplary controls are shown that enable a user to accept and/or further modify/edit avatar 118. FIG. 5C depicts an exemplary display of display device 108 after a user has opted to modify avatar 118. As shown in FIG. 5C, an overlay 510 or window is displayed on display device 108 that includes modification or editing tools (e.g., color palette, wardrobe modification tool(s), character/feature modification tool(s), etc.) that can be used to further modify the avatar 118.

Figure 5D:
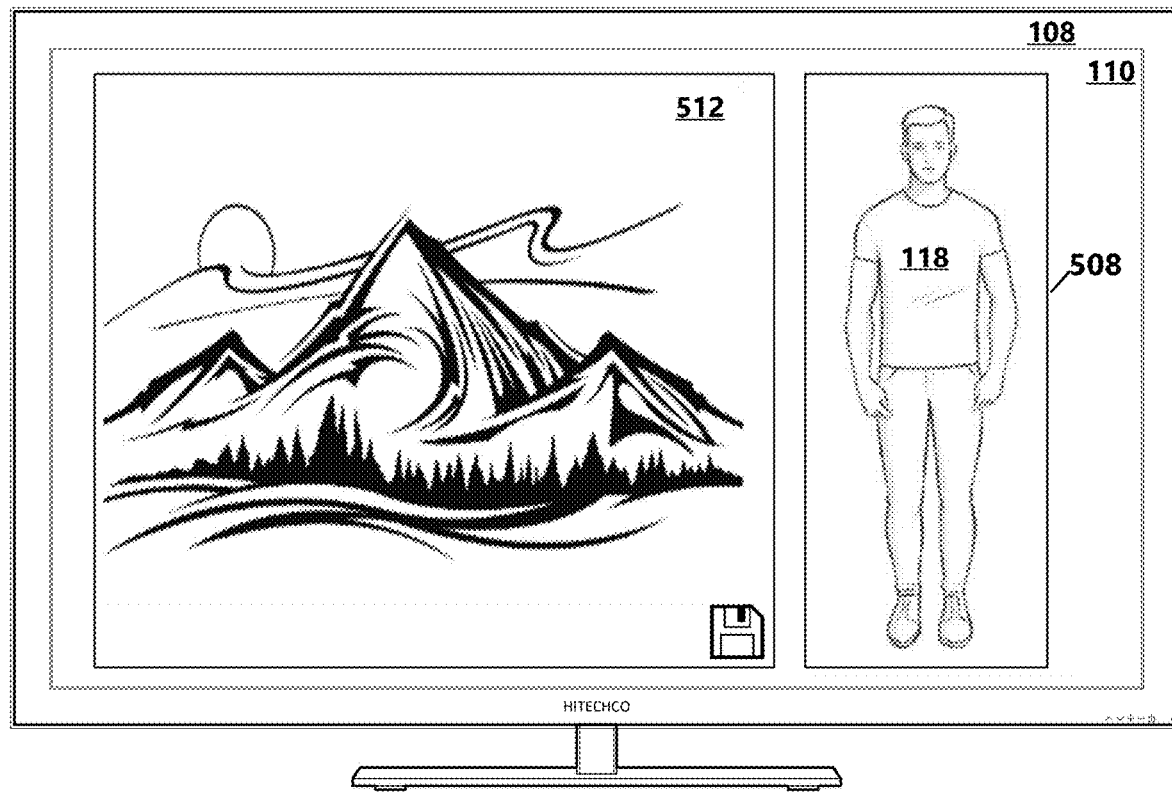

FIG. 5D depicts an exemplary display of display device 108 after a user has selected a scene 512 for use an accepted avatar 118. For example, a user can use a remote control, touch screen, gesture, companion device, or voice command to select a scene while paused. Trick play commands are also available to search for a particular scene, character, item, etc. In some cases, avatar creation UI 112 is configured to take a screen shot of what is displayed on display device 108 as part of generating a scene selection, avatar features, items or objects, etc. which can be communicated upstream to avatar creator platform 114 for further processing. If a user accepts (e.g., selects the save icon) the scene selection 512, the selected scene can be stored locally or in avatar database 120 with avatar 118. Local storage provides reduced latency when a scene, item, or avatar 118 is used in gaming, virtual, or other processing intensive environments. An avatar along with associated item(s) and/or scene(s) may be stored in a single file or in multiple files and identified using a subscriber identification (ID) or other identifier.

Figure 5E:
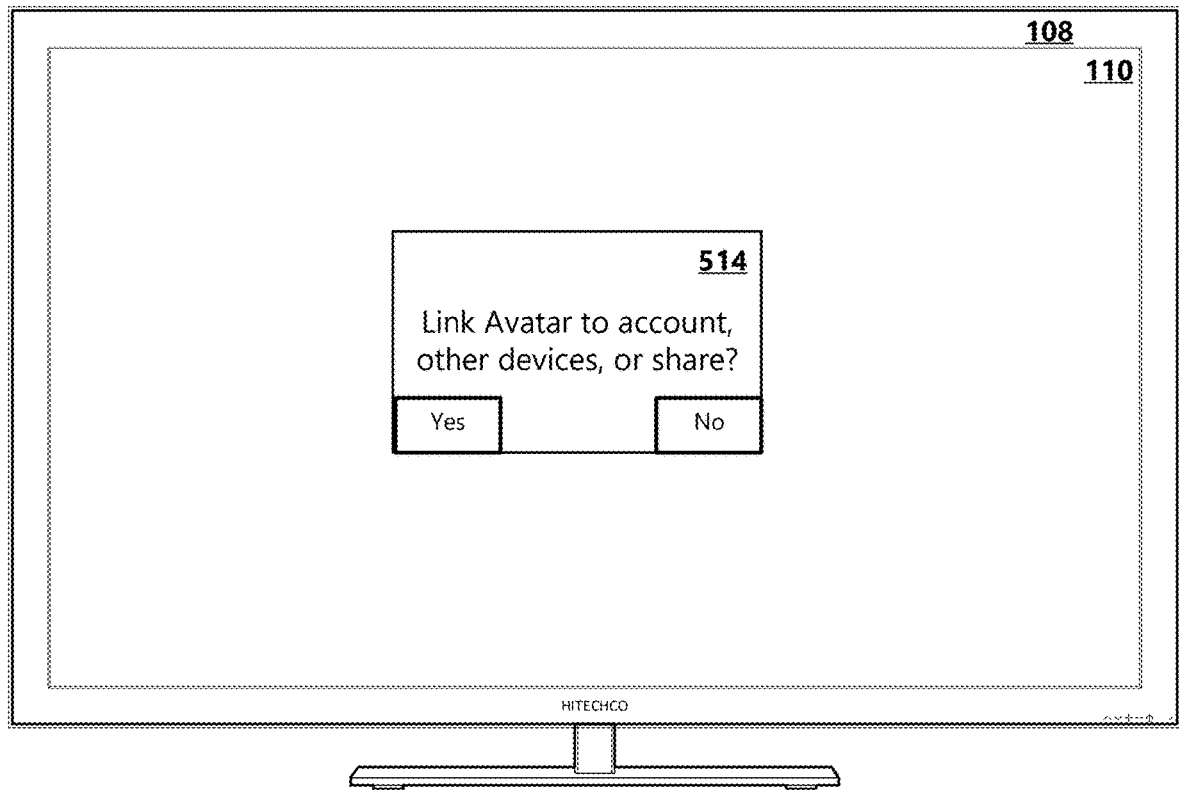
Figure 5F:
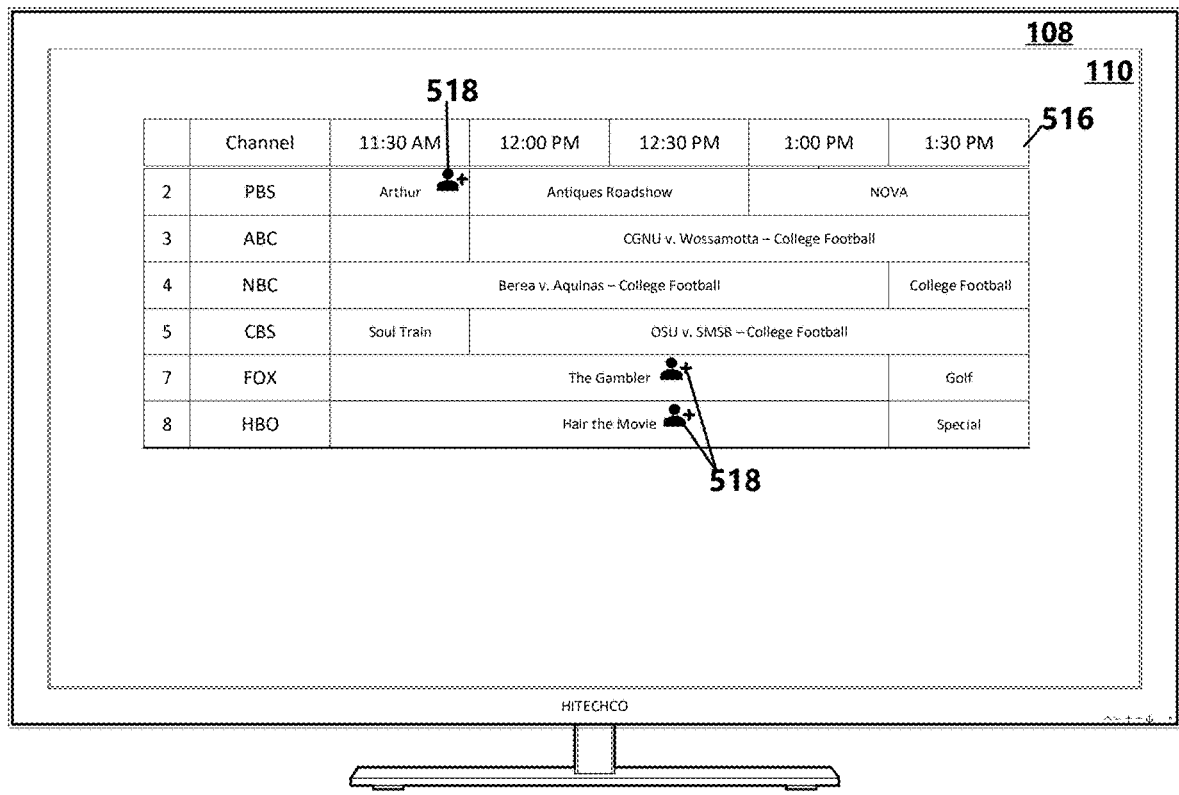

FIG. 5E depicts an exemplary display of display device 108 after avatar creation UI 112 has provided an option 514 to link the avatar 118 and/or any associated items or scenes to an account, other devices, and/or to share with other users. For example, option 514 can be provided in response to acceptance of the avatar 118, item, or scene 512. If the user actuates the "yes" control, avatar creation UI 112 is configured to provide additional screens (not shown) listing available accounts, device(s), and/or other users (e.g., friends) that can be identified for linking and/or sharing. FIG. 5F depicts an exemplary display of display device 108 showing a portion of a programming guide 516. As shown in FIG. 5F, an avatar icon 518 is displayed with various programs to inform a user that one or more characters of each program are available as avatars. Icon 518 can be selected to display one or more characters available as avatars as a separate screen or as an overlay over the guide 516. According to an aspect, selection of an icon 518 brings up a scene from the program (e.g., FIG. 5A).

As described herein, a platform supporting the avatar creation UI 112 can use active management of the available processing and memory resources spread across operator, public cloud facilities, edge computing facilities, and/or local processing resources to support potentially computationally expensive avatar processing operations. For example, it may be more efficient to stage avatar features in a cloud or edge resource for quick delivery to a user device when a user indicates an interest in a particular character or scene. According to an aspect, avatar creation UI 112 can be configured to use avatar creator platform 114 to generate avatars, including pertinent features and clothing/outfits by retrieving the requested information from an edge or cloud computing device, as described above.

The avatar creation platform is configured to collect data for creating an avatar 118 from a most efficient storage point. For example, multiple copies of information on a popular character's avatar might be downloaded for storage on multiple edge resources close to communities of likely consumers. Alternatively, information on less popular characters might be stored using cloud resources and only retrieved upon user interest. Machine learning engine 116 can be used to determine where the avatar creation process will reside in part or in all, such as on one or more of a streaming device, home gateway or STB, edge server 104, cloud server 106, etc. Additional information may be used to determine where to complete avatar processing operations. For example, based on a subscriber's subscription, purchase history, or processing priorities, the avatar creation UI 112 may use the edge or cloud computing for faster processing operations and delivery to an end-user.

As described by example below with respect to FIG. 6, according to an aspect, one or more outputs of machine learning engine 116 can be used to divide requests from avatar creation UI 112 between edge server 104, cloud server 106, and/or local processing resources based on required processing power and an amount of latency allowed taking into consideration download and/or upload speeds. Output of machine learning engine 116 can be used to determine how to support a computationally expensive process by use of algorithms that push the processing to edge server 104 or cloud server 106 for faster processing where the resource selection may be based on additional cost to the user, higher layer platform settings, or factors relating to network activity such as activity by other subscribers using a version of avatar creation UI 112.

In some cases, machine learning engine 116 can be configured to consider relative usage levels of the different processing resources to ensure that avatar creation UI 112 remains responsive to the user without undue interference to viewing or interaction with video content 110. Machine learning engine 116 can also be configured to account for whether a user tends to heavily customize avatar purchases, which might require more processing power, or if they tend to use pre-generated versions provided by content owners for example, with minimal alteration, which might require minimal processing power.

Figure 6:
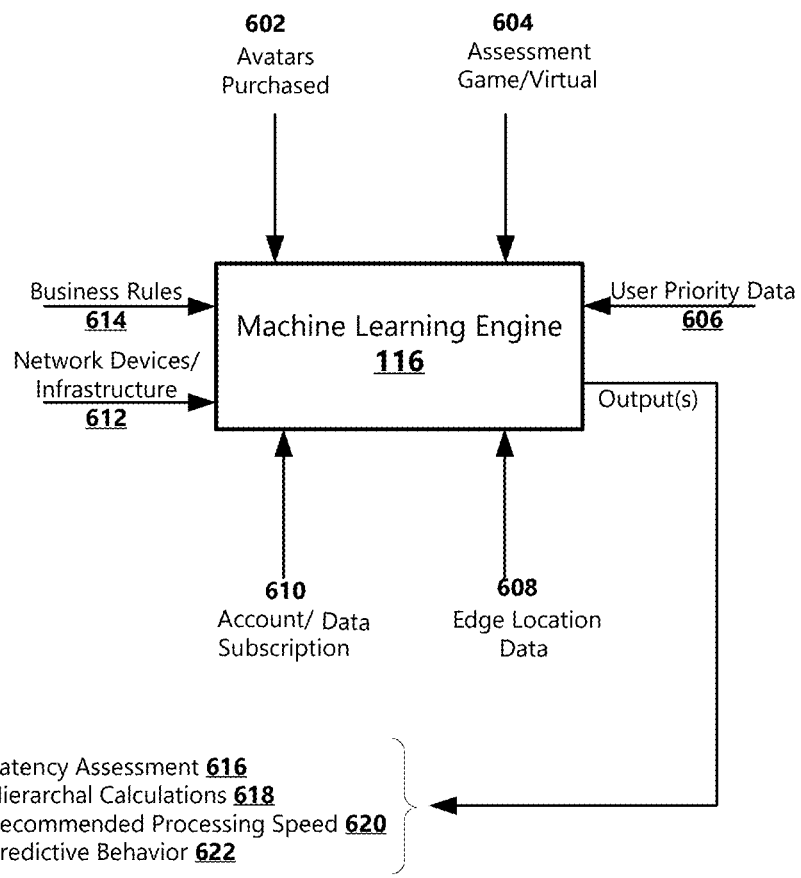
FIG. 6 is a block diagram illustrating an example implementation of a machine learning engine that can be used as part of creating an avatar while watching video content, according to an aspect.

FIG. 6 is a block diagram illustrating an example implementation of machine learning engine 116 including various inputs and outputs that can be used as part determining one or more processing resources to use when creating an avatar 118 while watching video content 110, according to an aspect. As shown in FIG. 6, inputs to machine learning engine 116 include an avatars purchased input 602, a game/virtual assessment input 604 that includes city/community data, platform type data and/or complexity data, identified user data 606 including user priority data based on subscription or other criteria, edge location data 608 associated with customer/subscriber locations, account/subscription data 610, network device and infrastructure data 612, and/or business rules 614. Business rules 614 can include various rule types such as customer or subscriber type, daily gaming and/or virtual reality usage and the time of the day, average upstream and downstream data rates, average time latency, power consumption, and/or other factors or parameters.

Based on one more or more of the exemplary inputs, machine learning engine 116 can use a machine learning algorithm to output one or more of a latency assessment 616 (e.g., a lowest achievable latency value) based on projected users, hierarchal calculations 618 to allocate an amount of processing to one or more processing resources (e.g., edge server 104, cloud server 106, local processing resource, etc.), recommended processing speed 620 based on a number of users playing a game or using a virtual environment, and/or predictive behavior 622 based on usage data and/or customer or subscriber profiles. According to one aspect, output of machine learning engine 116 allocates processing to various processing resources based on a target output of a lowest attainable latency and/or highest available processing speed.

One or more of the outputs of machine learning engine 116 can be used as part of determining how to best allocate avatar processing operations, gaming processing operations, virtual reality processing operations, etc. to available processing resources. In some cases, machine learning engine 116 can also be used to generate avatar features that were not found in images or video. Avatar creation UI 112 can be configured to request searching of additional images or video for avatar features that were not found in images or video of a particular video. For example, while creating an avatar 118, avatar creator platform 114 can process the avatar 118 on edge server 106 while searching local and/or remote archives for other images or video of different viewing angles for a particular character being used as a basis for the avatar 118.

As described herein, components of the avatar creation platform including the machine learning engine 116 can be located or distributed at an edge location, cloud location, back office location, locally, etc. depending in part on the required processing, latency, and bandwidth requirements to process the various inputs. In some aspects, machine learning engine 116 includes a machine learning algorithm that uses a clustering method to reduce latency on edge server 104 based on one or more of data speed of a user/subscriber, location, gaming or virtual reality platform type, etc. Machine learning engine 116 can utilize a classification method based on business and/or other rules to allow for highest processing speed, lowest amount of latency, and/or lowest amount of processing bandwidth required to create and/or immerse an avatar 118. Machine learning engine 116 can utilize a dimensionality reduction algorithm to reduce an amount of processing on edge server 104 by allocating some of the avatar processing operations to the cloud or local processing resources, such as one or more user devices (e.g., STB, gateway, tablet, laptop, smartphone, etc.).

Figure 7:
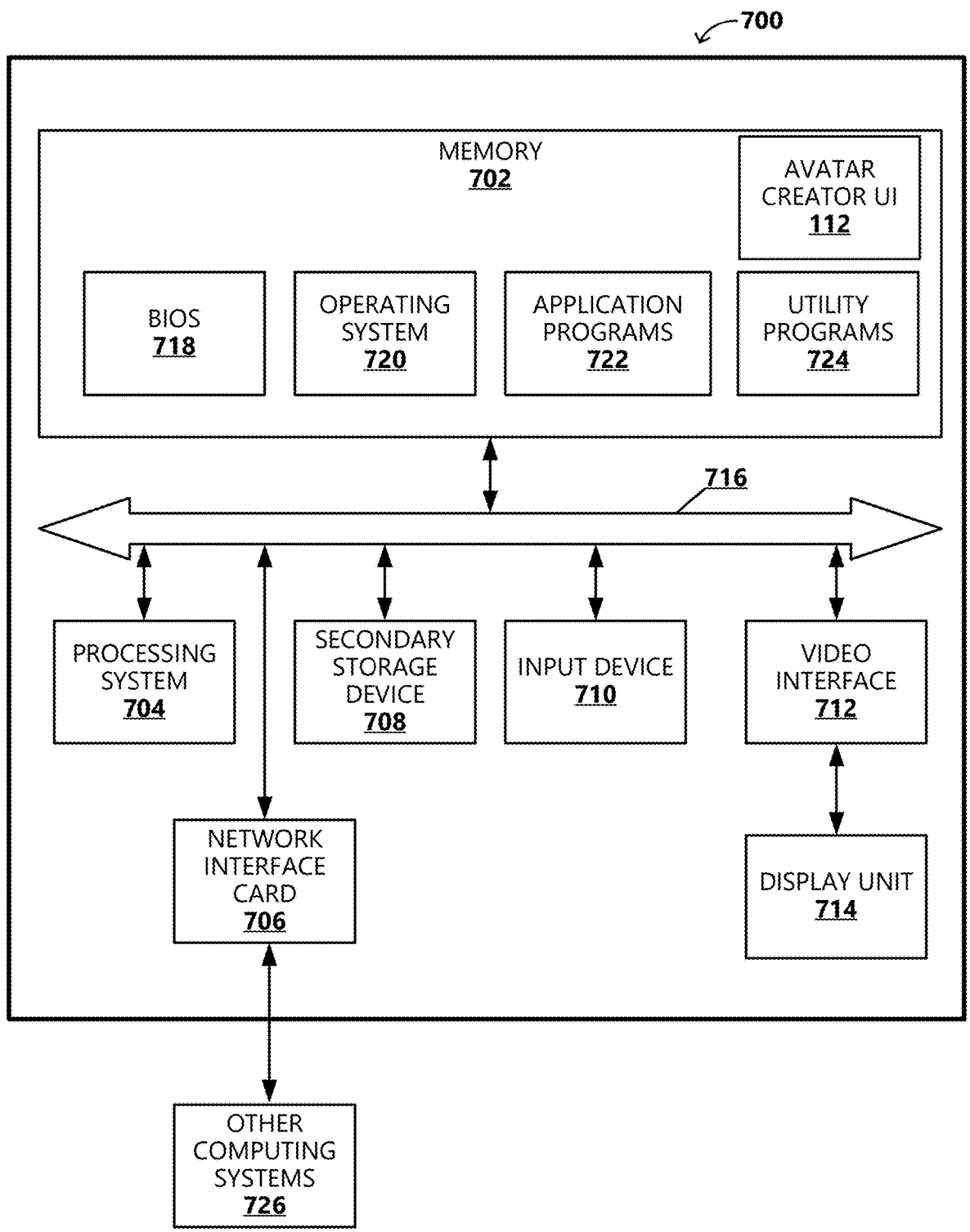
FIG. 7 is a block diagram illustrating example physical components of a computing device with which aspects may be practiced.

FIG. 7 is a block diagram illustrating example physical components of a computing device 700 or system with which embodiments may be practiced. Computing device 700 can be representative of edge server 104 or cloud server 106 for example. It should be appreciated that in other embodiments, different hardware components other than those illustrated in the example of FIG. 7 may be used. Computing devices may be implemented in different ways in different embodiments. In the example of FIG. 7, the computing device 700 includes a processing system 704, memory 702, a network interface card 706 (e.g., wired and/or wireless, cellular type, 802.11 type, etc.), a secondary storage device 708, an input device 710, a video interface 712, a display unit 714, and a communications medium 716. In other embodiments, the computing device 700 may be implemented using more or fewer hardware components (e.g., a video interface, a display unit, or an input device) or in combination with other types of computer systems and applications 726.

The memory 702 includes one or more computer-readable storage media capable of storing data and/or computer-executable instructions. Memory 702 may store the computer-executable instructions that, when executed by a processor of the processing system 704 operates to use avatar creation UI 112 to create an avatar 118 while a user is watching video content 110. In various embodiments, memory 702 is implemented in various ways. For example, the memory 702 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, applications, computer-executable instructions, or other data.

The processing system 704 includes one or more processing units, which may include tangible integrated circuits that selectively execute computer-executable instructions. In various embodiments, the processing units in the processing system 704 are implemented in various ways. For example, the processing units in the processing system 704 can be implemented as one or more processing cores. In this example, the processing system 704 can comprise one or more microprocessors. In another example, the processing system 704 can comprise one or more separate microprocessors. In yet another example embodiment, the processing system 704 can comprise Application-Specific Integrated Circuits (ASICs) that provide specific functionality. In yet another example, the processing system 704 provides specific functionality by using an ASIC and by executing computer-executable instructions.

The computing device 700 may be enabled to send data to and receive data from a communication network via a network interface card 706. In different embodiments, the network interface card 706 is implemented in different ways, such as an Ethernet interface, a token-ring network interface, a fiber optic network interface, a wireless network interface (e.g., cellular, BLUETOOTH, WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 708 includes one or more computer-readable storage media, and may store data and computer-executable instructions not directly accessible by the processing system 704. That is, the processing system 704 performs an I/O operation to retrieve data and/or computer-executable instructions from the secondary storage device 708. In various embodiments, the secondary storage device 708 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 710 enables the computing device 700 to receive input from a user. Example types of input devices include, but are not limited to, keyboards, mice, trackballs, stylus input devices, key pads, microphones, joysticks, touch-sensitive display screens, voice-enabled interfaces, and other types of devices that provide user input to the computing device 700.

The video interface 712 outputs video information to the display unit 714. In different embodiments, the video interface 712 is implemented in different ways. For example, the video interface 712 is a video expansion card. In another example, the video interface 712 is integrated into a motherboard of computing device 700. In various embodiments, the display unit 714 can be an LCD display panel, a touch-sensitive display panel, an LED screen, a projector, a cathode-ray tube display, or another type of display unit. In various embodiments, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 716 facilitates communication among the hardware components of the computing device 700. In different embodiments, the communications medium 716 facilitates communication among different components of the computing device 700. In the example of FIG. 7, the communications medium 716 facilitates communication among the memory 702, the processing system 704, the network interface card 706, the secondary storage device 708, the input device 710, and the video interface 712. In different embodiments, the communications medium 716 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, Serial Peripheral interface (SPI), IIC interface, Universal Asynchronous Receiver/Transmitter (UART) interface, or another type of communications medium.

The memory 702 stores various types of data and/or software instructions. For instance, in the example of FIG. 7, memory 702 stores a Basic Input/Output System (BIOS) 718 and an operating system 720. The BIOS 718 includes a set of software instructions that, when executed by the processing system 704, cause the computing device 700 to boot up. The operating system 720 includes a set of software instructions that, when executed by the processing system 704, cause the computing device 700 to provide an operating system that coordinates the activities and sharing of resources of the computing device 700. Memory 702 also stores one or more application programs 722 or program code (e.g., tracking algorithm 118) that, when executed by the processing system 704, cause the computing device 700 to provide applications to users. The memory 702 also stores one or more utility programs 724 that, when executed by the processing system 704, cause the computing device 700 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), WAN technologies (T1, Frame Relay), Point-to-Point Protocol over Ethernet (PPoE), etc. including any combination thereof.

Figure 8:
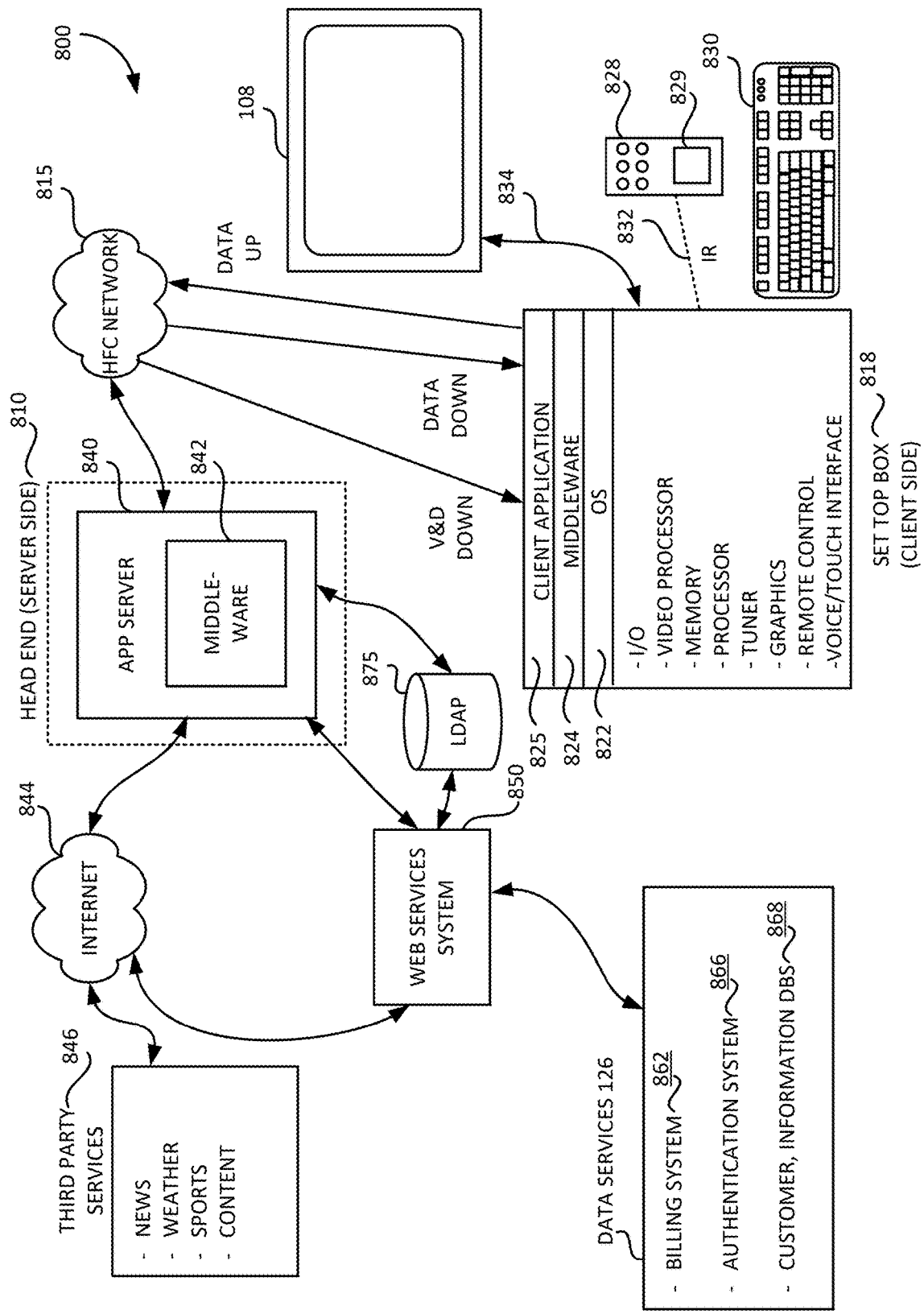
FIG. 8 is a block diagram illustrating components of a cable television system architecture providing an example operating environment according to aspects of the present disclosure.

FIG. 8 is a block diagram illustrating a cable television (CATV) system 800 architecture providing an example operating environment where a user can use avatar creation UI 112 to create an avatar 118, according to an aspect. According to aspects, a service provider may operate in the form of a CATV system 800 as illustrated and described in FIG. 8. As should be appreciated, a CATV system 800 is but one of various types of systems that can be utilized for providing an operating environment for creating an avatar 118. Referring now to FIG. 8, digital and analog video programming, information content and interactive television services are provided via a HFC network 802 to a television 816 for consumption by a cable television/services system customer. HFC networks 802 can combine both fiber optic cable lines and coaxial cable lines. Typically, fiber optic cable lines run from the cable head end 820 to neighborhoods of subscribers. Coaxial cable lines run from the optical fiber feeders to each customer or subscriber.

The CATV system 800 is in the form of a distributed client-server computing system for providing video and data flow across the HFC network 802 between server-side services providers (e.g., cable television/services providers), such as content delivery server 102, via a server-side head end 820 and a client-side customer via a set-top box (STB) 818 functionally connected to a customer receiving device, such as smart television 816. As described above, server-side head end 820 can include one or more edge servers 104 that may be used to process avatar creation operations. The functionality of the HFC network 802 allows for efficient bidirectional data flow between the set-top box 818 and an edge or application server 840 of the server-side head end 820. Modern CATV systems can provide a variety of services across the HFC network 802 including traditional digital and analog video programming, telephone services, high speed Internet access, video-on-demand, and services.

On the client side of the CATV system 800, digital and analog video programming and digital and analog data are provided to the customer television 816 via STB 818. Interactive television services that allow a customer to input data to the CATV system 800 likewise are provided by the STB 818. As illustrated in FIG. 8, the STB 818 is a multipurpose computing device having a computer processor, memory, and an input/output mechanism. The input/output mechanism receives input from server-side processes via the HFC network 802 and from customers via input devices such as a remote control device 828 that can be voice-activated, keyboard 830, or other computing device, such as a tablet/slate computer, smart phone, etc. The remote control device 828 and the keyboard 830 can communicate with the STB 818 via a suitable communication transport such as the infrared connection 832. The remote control device 828 can include a biometric input module 829. The STB 818 also includes a video processor for processing and providing digital and analog video signaling to the television 816 via a cable communication transport 834. A multi-channel tuner is provided for processing video and data to and from the STB 818 and the server-side head end 820, described below.

The STB 818 also includes an operating system 822 for directing the functions of the STB 818 in conjunction with a variety of client applications 825, such as avatar creation UI 112 or a processing allocation module for example. For example, if a client application 825 requires an available avatar to be displayed on the television 816, the operating system 822 can cause the graphics functionality and video processor of the STB 818, for example, to output the available avatar to the television 816 at the direction of the avatar creation UI 112.

Because a variety of different operating systems 822 can be utilized by a variety of different brands and types of set-top boxes 818, a middleware layer 824 can be provided to allow a given software application to be executed by a variety of different operating systems. According to an embodiment, the middleware layer 824 can include a set of application programming interfaces (APIs) that are exposed to client applications and operating systems 822 that allow client applications 825 to communicate with the operating systems 822 through common data calls understood via the API set. As described below, a corresponding middleware layer 842 is included on the server side of the CATV system 800 for facilitating communication between the server-side application server and the client-side STB 818. The middleware layer 842 of the server-side application server and the middleware layer 824 of the client-side STB 818 can format data passed between the client side and server side according to the Extensible Markup Language (XML).

According to one aspect, the STB 818 passes digital and analog video and data signaling to the television 816 via a one-way communication transport 834. According to other aspects, two-way communication transports can be utilized, for example, via high definition multimedia (HDMI) ports. The STB 818 can receive video and data from the server side of the CATV system 800 via the HFC network 802 through a video/data downlink and data via a data downlink. The STB 818 can transmit data from the client side of the CATV system 800 to the server side of the CATV system 800 via the HFC network 802 via one data uplink. The video/data downlink is an "in band" downlink that allows for digital and analog video and data signaling from the server side of the CATV system 800 through the HFC network 802 to the STB 818 for use by the STB 818 and for distribution to the television 816. The "in band" signaling space operates at a relative high frequency, e.g., between 54 and 1000 megahertz. The signaling space is generally divided into 6 megahertz channels in which can be transmitted as a single analog signal or a greater number (e.g., ten) of digital signals.

The data downlink and the data uplink, illustrated in FIG. 8, between the HFC network 802 and the STB 818 comprise "out of band" data links. The "out of band" frequency range is generally at a lower frequency than "in band" signaling. For example, the "out of band" frequency range can be between zero and 54 megahertz. Data flow between the STB 818 and the server-side application server 840 is typically passed through the "out of band" data links. Alternatively, an "in band" data carousel can be positioned in an "in band" channel into which a data feed can be processed from the application server 840 through the HFC network 802 to the STB 818. Operation of data transport between components of the CATV system 800, described with reference to FIG. 8, is well known to those skilled in the art.

Referring still to FIG. 8, the head end 820 of the CATV system 800 is positioned on the server side of the CATV system and includes hardware and software systems responsible for originating and managing content for distributing through the HFC network 802 to client-side STBs 818 for presentation to customers. As described above, a number of services can be provided by the CATV system 800, including digital and analog video programming, interactive television services, telephone services, video-on-demand services, targeted advertising, and/or provision of supplemental content.

The application server 840 can be configured as a computing system operative to assemble and manage data sent to and received from the STB 818 via the HFC network 802. As described above, the application server 840 includes a middleware layer 842 for processing and preparing data from the head end 820 of the CATV system 800 for receipt and use by the client-side STB 818. For example, the application server 840 via the middleware layer 842 can obtain supplemental content from third-party services 846 via the Internet 844 for transmitting to a customer through the HFC network 802, the STB 818, and recording by a local or remote DVR. For example, content metadata from a third-party content provider service can be downloaded by the application server 840 via the Internet 844. When the application server 840 receives the downloaded content metadata, the middleware layer 842 can be utilized to format the content metadata for receipt and use by the STB 818. Therefore, content metadata can be sent and categorized based on the availability to the customer's program guide data.

According to one embodiment, data obtained and managed by the middleware layer 842 of the application server 840 is formatted according to the Extensible Markup Language and is passed to the STB 818 through the HFC network 802 where the XML-formatted data can be utilized by a client application 825 in concert with the middleware layer 824, as described above. A variety of third-party services data 846, including news data, weather data, sports data and other information content can be obtained by the application server 840 via distributed computing environments such as the Internet 844 for provision to customers via the HFC network 802 and the STB 818. Additionally, the application server 840 may receive data via the Internet 844.

According to aspects, the application server 840 obtains customer support services data, including billing data, information on customer work order status, answers to frequently asked questions, services provider contact information, and the like from data services 826 for provision to the customer via an interactive television session. The data services 826 include a number of services operated by the services provider of the CATV system 800 which can include profile and other data associated with a given customer.

A billing system 862 can include information such as a customer's name, street address, business identification number, Social Security number, credit history, and information regarding services and products subscribed to by the customer. According to embodiments, the billing system 862 can also include billing data for services and products subscribed to by the customer for bill processing, billing presentment and payment receipt. An authentication system 866 can include information such as secure user names, subscriber profiles, subscriber IDs, and passwords utilized by customers for access to network services. A customer information database 868 can include general information about customers such as place of employment, business address, business telephone number, and demographic information such as age, gender, educational level, and the like. The customer information database 868 can also include information on pending work orders for services or products ordered by the customer. The customer information database 868 can also include general customer information such as answers to frequently asked customer questions and contact information for various service provider offices/departments. As should be understood, this information can be stored in a variety of disparate databases operated by the cable services provider.

Referring still to FIG. 8, web services system 850 is illustrated between the application server 840 and the data services 826. According to aspects, web services system 850 serves as a collection point for data requested from each of the disparate data services systems comprising the data services 826. According to aspects, when the application server 840 requires customer services data from one or more of the data services 826, the application server 840 passes a data query to the web services system 850. The web services system 850 formulates a data query to each of the available data services systems for obtaining any required data for a requesting customer as identified by a set-top box identification associated with the customer. The web services system 850 serves as an abstraction layer between the various data services systems and the application server 840. That is, the application server 840 is not required to communicate with the disparate data services systems, nor is the application server 840 required to understand the data structures or data types utilized by the disparate data services systems. The web services system 850 is operative to communicate with each of the disparate data services systems for obtaining necessary customer data. The customer data obtained by the web services system is assembled and is returned to the application server 840 for ultimate processing via the middleware layer 842, as described above. The disparate systems 850, 862, 866, 868 can be integrated or provided in any combination of separate systems, wherein FIG. 8 shows only one example.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:
1. A method for generating an avatar while watching video content comprising:
 receiving a request to create the avatar based on the video content;
 in response to receiving the request to create the avatar based on the video content, determining one or more processing resources to use to create the avatar based on an output of a machine learning engine, wherein the one or more processing resources include a cloud-based processing resource, an edge-based processing resource, and a local processing resource;
 allocating avatar processing operations to the one or more processing resources to create the avatar based on the output from the machine learning engine;
 creating the avatar using the one or more processing resources, wherein creating the avatar further comprises:
  requesting a character feature not displayed in the video content from different video content or images available at the cloud-based processing resource,
  providing the character feature from the different video content or images to the edge-based processing resource, and using the edge-based processing resource to create the avatar using the character feature from the different video content or images; and storing the avatar in an avatar database.

2. The method of claim 1, wherein the output of the machine learning engine is based on a complexity of the avatar and whether existing different viewing angle images are available to complete a full model of the avatar.

3. The method of claim 1, wherein the output of the machine learning engine is based on a plurality of inputs including one or more of a subscription type, prior avatars created for a subscriber, an amount of available processing bandwidth, processing bandwidth required for creating the avatar, type of video content being watched, time of day, an amount of latency, and an estimated time to process the avatar.

4. The method of claim 1, wherein the output of the machine learning engine corresponds with at least one of:
creating the avatar using the cloud-based processing resource;
creating the avatar using the edge-based processing resource;
creating the avatar using a combination of the cloud-based processing resource and the edge-based processing resource;
creating the avatar using a combination of the edge-based processing resource and the local processing resource; and
creating the avatar using a combination of the cloud-based processing resource and the local processing resource.

5. The method of claim 1, wherein the output of the machine learning engine corresponds with creating the avatar using the edge-based processing resource to reduce an amount of latency while creating or modifying the avatar.

6. The method of claim 1, wherein creating the avatar using the one or more processing resources includes generating a three-dimensional (3D) model of the one or more characters or objects.

7. The method of claim 1, further comprising receiving a request to immerse the avatar into a virtual environment.

8. The method of claim 7, further comprising sending a request to the machine learning engine to identify one or more of the processing resources to process immersing the avatar in the virtual environment.

9. The method of claim 1, further comprising using the machine learning engine to determine character features of a character selected for the avatar that were not displayed in the video content.

10. The method of claim 1, further comprising using the machine learning engine to determine which of the one or more processing resources to create the avatar based on a type of the video content being watched, wherein the type of video content includes linear video content, video-on-demand (VOD) content, broadcast video content, subscribed to video content, and unsubscribed to video content.

11. A system for generating an avatar while watching video content comprising:
a cloud-based processing resource;
an edge-based processing resource;
a local processing resource;
a machine learning engine; and
an avatar generation platform configured to:
receive a request to create the avatar based on the video content;
in response to receipt of the request to create the avatar from the video content, send a request to the machine learning engine to identify one or more processing resources to create the avatar, wherein the one or more processing resources include the cloud-based processing resource, the edge-based processing resource, and the local processing resource;
receive an output from the machine learning engine that allocates avatar processing operations to the one or more processing resources to create the avatar;
create the avatar using the one or more processing resources, wherein the avatar generation platform being configured to create the avatar comprises the avatar generation platform being configured to:
request character features not displayed in the video content from different video content or images available at the cloud-based processing resource,
provide the character features from the different video content or images to the edge-based processing resource, and
use the edge-based processing resource to create the avatar using the character features from the different video content or images; and
store the avatar.

12. The system of claim 11, wherein the output of the machine learning engine is based on a plurality of inputs including one or more of a subscription type, prior avatars created for a subscriber, an amount of available processing bandwidth, processing bandwidth required for creating the avatar, type of video content being watched, time of day, an amount of latency, and an estimated time to process the avatar.

13. The system of claim 11, wherein the output of the machine learning engine corresponds with at least one of:
creation of the avatar using the cloud-based processing resource;
creation of the avatar using the edge-based processing resource;
creation of the avatar using a combination of the cloud-based processing resource and the edge-based processing resource;
creation of the avatar using a combination of the edge-based processing resource and the local processing resource; and
creation of the avatar using a combination of the cloud-based processing resource and the local processing resource.

14. The system of claim 11, further configured to, in response to a request to immerse the avatar, send a request to the machine learning engine to identify one or more of the processing resources to process immersion of the avatar in the virtual environment.

15. A non-transitory computer readable storage medium that includes instructions which, when executed, cause a processor to:
receive a request to create the avatar based on the video content;
in response to receipt of the request to create the avatar from the video content, send a request to a machine learning engine to identify one or more processing resources to create the avatar, wherein the one or more processing resources include a cloud-based processing resource, an edge-based processing resource, and a local processing resource;
receive an output from the machine learning engine that allocates avatar processing operations to the one or more processing resources to create the avatar;
create the avatar using the one or more processing resources, wherein the instructions causing the processor to create the avatar further comprises the instructions causing the processor to:
  request character features not displayed in the video content from different video content or images available at the cloud-based processing resource,
  provide the character features from the different video content or images to the edge-based processing resource, and
  use the edge-based processing resource to create the avatar using the character features from the different video content or images; and
  store the avatar in a computer storage device.

16. The non-transitory computer readable storage medium of claim 15, wherein the output of the machine learning engine is based on a plurality of inputs including one or more of a subscription type, prior avatars created for a subscriber, an amount of available processing bandwidth, processing bandwidth required for creating the avatar, type of video content being watched, time of day, an amount of latency, and an estimated time to process the avatar.

17. The non-transitory computer readable storage medium of claim 15, wherein the output of the machine learning engine corresponds with at least one of:
  creation of the avatar using the cloud-based processing resource;
  creation of the avatar using the edge-based processing resource;
  creation of the avatar using a combination of the cloud-based processing resource and the edge-based processing resource;
  creation of the avatar using a combination of the edge-based processing resource and the local processing resource; and
  creation of the avatar using a combination of the cloud-based processing resource and the local processing resource.

18. The non-transitory computer readable storage medium of claim 15, wherein creating the avatar using the one or more processing resources includes generating a three-dimensional (3D) model of the one or more characters or objects.

19. The non-transitory computer readable storage medium of claim 15, further comprising receiving a request to immerse the avatar into a virtual environment.

20. The non-transitory computer readable storage medium of claim 15, further comprising sending a request to the machine learning engine to identify one or more of the processing resources to process immersing the avatar in the virtual environment.

* * * * *